United States Patent Office 3,280,060
Patented Oct. 18, 1966

3,280,060
COMPOSITION OF SHELLAC AND AROMATIC HYDROCARBON PHENOL RESIN
Ching Yun Huang, Minoo-shi, and Kazuo Ueno and Hisanori Tanabe, Ibaragi-shi, Japan, assignors to Japan Gas-Chemical Company, Inc., Tokyo, Japan, a corporation of Japan
No Drawing. Filed Sept. 18, 1964, Ser. No. 397,619
Claims priority, application Japan, Sept. 19, 1963, 38/50,152
4 Claims. (Cl. 260—25)

This invention relates to a composition of shellac and aromatic hydrocarbon phenol resin having improved water resistance, and a method for manufacturing the same.

As generally known, a shellac is a thermosetting natural resin which has superior properties in adhesiveness, electrical insulation, hardness and elesaticity of films, etc. These characteristic properties have been utilized extensively and advantageously in various fields such as lacquers, electrical insulation varnishes, adhesives, etc. In spite of these superior properties, the shellac has only, but great disadvantage of poor water resistance. On account of this, when it is used as an electrical insulating varnish, it absorbs moisture and causes a drastic fall of insulating property after an elapse of time and when it is used as an adhesive, it causes fall of adhering strength after an elapse of time. In practical application the said resin has shown a number of troubles caused by the disadvantage drawback mentioned previously. Therefore it is a long pending problem for those who have been engaged in the field of shellac application to improve its water resistance.

It is, therefore, the general object of the present invention to provide a shellac composition which has improved water resistance. It is another object of the present invention to provide a method for producing a shellac composition having improved water resistance.

The present invention, by mixing shellac and aromatic hydrocarbon phenol resin, and heated under a suitable condition to unite shellac with aromatic hydrocarbon phenol resin, relates that water resistance of shellac has been markedly improved.

Shellac is composed of aleuritic acid, shellolic acid, other shellac resin acids and their condensation products. These compounds have many hydrophilic hydroxy and carboxyl acid radicals, which are considered to be the origin of the poor water resistance.

While the other constituent, the aromatic hydrocarbon phenol resin is composed of extremely highly water resistant aromatic hydrocarbon and it is therefore, originally extremely water resistant resin. By uniting this resin chemically with shellac, water resistance of shellac has been greatly improved.

An aromatic hydrocarbon phenol resin useful for the present invention consists essentially of a modified resin obtained by reacting a viscous liquid or solid aromatic hydrocarbon aldehyde resin having from 3 to 18 percent by weight of oxygen content, i.e., benzene formaldehyde resin, xylene formaldehyde resin, xylene acetaldehyde resin, durene butyl aldehyde resin, methylnaphthalein formaldehyde resin or the like with a phenol having 2 or more active positions for formaldehyde such as phenol, cresol, xylenol, teriary butylphenyl, nonylphenol, 2,2,-bis-(4-hydroxyphenyl)propane or the like or with one or more than one kind of phenol-aldehyde condensation product. Either novolak corresponding type or resol corresponding type of phenol resin can be used.

The novolak type is a product which is obtained by reacting above mentioned aromatic hydrocarbon aldehyde resin with phonols, or is a product obtained by further condensation with aldehyde in the presence of an acidic catalyst when unreacted free phenol is remaining even after the above mentioned reaction.

The resol type is a product which is obtained by reacting an aromatic hydrocarbon aldehyde resin with phenol of more than 3 active positions for formaldehyde (including 3) and then further condensing with formaldehyde in the presence of alkaline catalyst.

An aromatic hydrocarbon aldehyde resin is a product which is obtained by reacting aromatic hydrocarbon such as benzene, toluene, xylene, mesitylene, durene, naphthalein, methylnaphthalein, anthracene or the like with an aliphatic aldehyde having at the highest 4 carbon atoms such as formaldehyde, acetaldehyde, butyldehyde or the like, in the presence of an acidic catalyst.

The reaction of shellac with an aromatic hydrocarbon phenol resin is put into practice in accordance with the following process.

Shellac and aromatic hydrocarbon resin can be reacted by the process related in the present invention whatever their ratio of mixture may be. However, in order to obtain greater improvement of its water resistance 100 parts by weight of shellac, it is preferable to be mixed with 10 to 50 parts by weight of aromatic hydrocarbon phenol resin.

A resol type or a novolak type or a mixture of two types of aromatic hydrocarbon phenol resin which is prepared by reacting 100 parts by weight of aromatic hydrocarbon aldehyde resin with from 50 to 400 parts by weight of phenols, is dissolved in a suitable amount of solvent with the aforementioned amount of shellac and homogeneous solution is heated to cause reaction. Heating temperature is higher than 50° C., but preferably from 70° C. to 120° C. is to be used. Though 30 minutes of heating time is sufficient, several hours of heating is required to improve water resistance. It is possible to use a suitable catalyst such as p-toluene sulfonic acid phosphoric acid, hexamethylene tetramine, rosin, caustic soda or the like as a curing speed controller of shellac to control the reaction advantageously. However, use of catalyst is not indispensable.

The improvement of water resistance of shellac of the present invention can be put into practice by heating after preparing a varnish consisting of shellac and aromatic hydrocarbon phenol resin dissolved in a solvent making a film on the surface of a glass or an iron plate. In such a case heating is preferably carried out with more than 80° C. In case a solvent is not used in heating, the homogeneous reaction will not proceed and local gel formation will at times take place. A mixture of aromatic hydrocarbon and alcohols is most suitable as a solvent.

Besides water resistance, the modified shellac produced by the present invention has numerous advantages. The modified shellac has increased its solubility to aromatic hydrocarbons and improved compatibility with other resins such as vinyl resins. Not only water resistance is remarkably increased by the modified shellac but also hardness and luster are improved simultaneously. Further more the improvement of adhesion to metals is also another advantage. Accordingly, the present invention has removed various drawbacks caused by poor water resistance of shellac and developed a number of new fields of applications from shellac which has been prevented to explore. Furthermore the compatibility to drying oils obtained by the present invention enable the modified shellac to be used as an oil varnish.

When the modified varnish is painted on wooden floors, its excellent water resistance retains the original luster even after washing over 30 times.

It is still a further advantage of the modified shellac that the curing time can be controlled by the selective use of resol type and novolak type of aromatic hydrocarbon phenol resin. Namely, when the resol type resin is used, the curing time is faster than shellac alone, and when the novolak type resin is used, the curing time is slower than the simple shellac. When a resol type resin is used in the form of varnish, impregnating paper, cloth or glass fibers, etc., laminated sheets having excellent punching property is obtained by heat-curing. When a novolak type resin is used in molded products strong and stiff products can be obtained by using hexamine as a curing promoter.

Modified shellac which has improved its water resistance by the process described in the present invention is characterized in that shellac is chemically combined with an aromatic hydrocarbon phenol resin, fact can be proved by the following comparative experiment.

30 parts by weight of resol type xylene phenol resin and 100 parts by weight of shellac were dissolved in a mixed solvent consisting of 100 parts by weight of methanol and 10 parts by weight of toluene at a room temperature. One portion of resulting varnish was dried at a room temperature to make a transparent sample of film (I). The other portion of this varnish was heated while refluxing the solvent for 5 hours to complete the reaction. Subsequently the heated varnish was dried at room temperature to make another transparent sample of film (II). A simple shellac varnish was also dried at a room temperature to make a transparent sample of film (III). After immersing three kinds of samples of film in water, the following differences were found as shown in Table 1.

*Table 1*

|  | Varnish (III) | Varnish (II) | Varnish (I) |
|---|---|---|---|
| Before immersion | Transparent | Transparent | Transparent. |
| After immersion of 8 hours. | Slightly opaque. | do | Slightly opaque. |
| After immersion of 24 hours. | Opaque | do | Opaque. |
| After immersion of 48 hours. | do | do | Do. |

Note.—Varnish (III): A simple shellac varnish. Varnish (II): A heated varnish consisting of shellac-xyleneformaldehyde resin. Varnish (I): A mixed varnish consisting of shellac-xylene phenol resin.

From the result of Table 1 the heated modified shellac consisting of shellac and aromatic hydrocarbon phenol resin, i.e., the composition of the present invention clearly shows the improved water resistance. On the other hand a varnish prepared by simple mixing of the constituents does not show the difference from a simple shellac varnish. In other words, there is no appreciable improvement of water resistance in the case of film prepared without heat treatment. Accordingly it is concluded that the modified shellac by the present invention reacts with aromatic hydrocarbon phenol resin by heating, and thus the water resistance is improved. Though the detail of reaction mechanism is not clear, it is believed that the phenolic hydroxy radicals and methylol radicals of aromatic hydrocarbon phenol resin are united partly with the active double bonds, hydroxy radicals and carboxylic radicals of shellac.

In order that those skilled in the art may more fully understand the nature of my invention and the method of carrying it out, the following examples are given:

EXAMPLE 1

Xylene phenol resin of softening point 83° C. was obtained by reacting mixture of 100 parts by weight xylene formaldehyde resin (oxygen content 10.7% by weight), 60 parts by weight phenol and 0.1 part by weight p-toluene sulfonic acid for three hours at 100°–150° C. The mixture of 20 parts by weight of the above resin, 10 parts by weight of xylene, 90 parts by weight of butanol and 100 parts by weight of shellac was heated and stirred for 5 hours at 100° C. A film with a good luster was obtained by painting reacted liquid on the glass plate and dried at room temperature for two hours.

EXAMPLE 2

Toluene cresol resin of softening point 109° C. was obtained by reacting the mixture of 100 parts by weight toluene formaldehyde resin (oxygen content 12.3% by weight), 140 parts by weight m-cresol and 0.1 part by weight p-toluene sulfonic acid for one hour at 120° C. then reacting the above reactant for 2 hours in the presence of reflux after adding 50 parts by weight formalin and 4 parts by weight 1 N hydrochloric acid and finally dehydrating the reactant in open air up to 150° C. A coated film having high hardness was obtained applying 50 parts by weight said resin and 100 parts by weight shellac after desolving into 20 parts by weight toluene and 100 parts by weight methanol on a glass plate and drying at room temperature for 24 hours before heating 30 minutes at 100° C.

EXAMPLE 3

The mixture of 100 parts by weight xylene formaldehyde resin (oxygen content 10.7 by weight), 150 parts by weight phenol and 0.1 part by weight p-toluene sulfonic acid was reacted for one hour at 120° C. Xylene phenol resin resol varnish was obtained by reacting the reacted mixture with 200 parts by weight 37% formalin and 28 parts by weight aqueous ammonia for one hour at 80° C., then dehydrating by reducing pressure and finally adding 250 parts by weight mixed solvent of two parts by weight xylene and one part by weight butanol to the dehydrated reactant. The mixture of 50 parts by weight of the above resol varnish, 40 parts by weight butanol and 100 parts by weight shellac was heated and stirred for three hours at 100° C. The reacted liquid was painted on a glass plate, and a film was obtained after drying the liquid for 72 hours at room temperature.

EXAMPLE 4

The mixture of 100 parts by weight naphthalene formaldehyde resin (oxygen content 6.9% by weight), 150 parts by weight phenol and 0.3 part by weight p-toluene sulfonic acid was treated for one hour at 120° C. Naphthalene phenol resin of softening point 92° C. was obtained by reacting the reacted mixture with 90 parts by weight 37% formalin and 3 parts by weight 10% hydrochloric acid in the presence of reflux for 90 minutes, then dehydrating up to 200° C. at normal pressure. The mixed solution of 40 parts by weight naphthalene phenol resin, 100 parts by weight methanol, 40 parts by weight toluene and 100 parts by weight shellac was painted on a glass plate. A film having high hardness and good luster was obtained after drying the liquid for 24 hours at room temperature and heated for 30 minutes at 100° C.

EXAMPLE 5

The modified resin of softening point 80° C. was obtained by reacting the mixture of 100 parts by weight xylene acetaldehyde resin (oxygen content 7.1% by weight), 20 parts by weight p-tertiallybutyl phenol, 30 parts by weight phenol and 0.1 part by weight m-xylene sulfonic acid for 5 hours at 100°–150° C. The mixture of 10 parts by weight of the above modified resin, 100 parts by weight methanol, 10 parts by weight toluene and 100 parts by weight shellac was heated and stirred, for six hours at reflux temperature. The obtained modified shellac varnish was painted on a glass plate and dried for 72 hours at room temperature. A film having high hardness and good luster was obtained.

Table 2 shows a comparison of the films obtained in the examples and immersed in water at 250° C. with respect to the immersing time and the degree of divitrification.

Table 2

| Kind of film | Immersing time (hr.) | | | |
|---|---|---|---|---|
| | 0 | 8 | 24 | 200 |
| Example 1 | Transparent | Transparent | Transparent | Somewhat opaque. |
| Example 2 | do | do | do | Transparent. |
| Example 3 | do | do | do | Do. |
| Example 4 | do | do | do | Do. |
| Example 5 | do | do | do | Somewhat opaque. |
| Shellac varnish film dried at room temp | do | Somewhat opaque. | Opaque | Opaque. |
| Shellac varnish film baked at 100° C. for 30 min. | do | Transparent | Somewhat opaque. | Do. |

What is claimed is:
1. A process for producing a water resistant composition comprising reacting at a temperature of from 50° to 200° C. for at least 30 minutes in a solvent of a mixture of an aromatic hydrocarbon and an alcohol,
   (A) from 10 to 50 parts of a resin formed by reacting,
      (1) a material selected from the group consisting of aromatic hydrocarbon aldehyde resins formed by reacting in the presence of an acidic catalyst (a) an aromatic hydrocarbon selected from the group consisting of benzene, toluene, xylene, mesitylene, durene, naphthalene, methylnaphthalene and anthracene, and (b) an aldehyde selected from the group consisting of formaldehyde, acetaldehyde, propionaldehyde and butylaldehyde, and
      (2) a phenol selected from the group consisting of phenol, cresol, xylenol, tertiary butylphenol, nonyl phenol, and 4,4'-isopropyl bisphenol, with,
   (B) 100 parts of shellac.

2. The product of the process of claim 1.
3. The process of claim 1, wherein said solvent comprises a mixture of an aromatic hydrocarbon selected from the group consisting of benzene, toluene and xylene, and an alcohol selected from the group consisting of methanol, ethanol, propanol and butanol.
4. The product of the process of claim 3.

References Cited by the Examiner

UNITED STATES PATENTS

| 1,730,417 | 10/1929 | Gardner | 260—25 |
| 1,844,824 | 2/1932 | Seebach | 260—19 |
| 2,308,544 | 1/1943 | Rosenblum | 260—53 |

LEON J. BERCOVITZ, *Primary Examiner.*

F. McKELVEY, *Assistant Examiner.*